(12) United States Patent
Smith et al.

(10) Patent No.: US 10,920,744 B2
(45) Date of Patent: Feb. 16, 2021

(54) MANUFACTURE OF WIND TURBINE BLADES

(71) Applicant: Vestas Wind Systems A/S, Aarhus N. (DK)

(72) Inventors: Jonathan Smith, Burridge (GB); Trevor Corsham, Newport (GB); Steve Wardropper, New Milton (GB)

(73) Assignee: Vestas Wind Systems A/S, Aarhus N. (DK)

( * ) Notice: Subject to any disclaimer, the term of this patent is extended or adjusted under 35 U.S.C. 154(b) by 89 days.

(21) Appl. No.: 15/777,398

(22) PCT Filed: Nov. 23, 2016

(86) PCT No.: PCT/DK2016/050393
§ 371 (c)(1),
(2) Date: May 18, 2018

(87) PCT Pub. No.: WO2017/088890
PCT Pub. Date: Jun. 1, 2017

(65) Prior Publication Data
US 2018/0328335 A1 Nov. 15, 2018

(30) Foreign Application Priority Data
Nov. 26, 2015 (DK) .................. 2015 70764

(51) Int. Cl.
*F03D 1/06* (2006.01)
(52) U.S. Cl.
CPC .......... *F03D 1/0675* (2013.01); *F03D 1/065* (2013.01); *F03D 1/0683* (2013.01);
(Continued)

(58) Field of Classification Search
CPC ...... F03D 1/0675; F03D 1/0683; F03D 1/065; B64C 3/185
(Continued)

(56) References Cited

U.S. PATENT DOCUMENTS 400,803 A * 4/1889 Stouffer .................... F16B 2/02
403/257
1,180,648 A * 4/1916 Hubbell ................. H01R 13/64
439/679
(Continued)

FOREIGN PATENT DOCUMENTS

CA 2868654 A1 10/2013
CN 101589227 A 11/2009
(Continued)

OTHER PUBLICATIONS

"Poka Yoke" by pdcahome (Year: 2013).*
(Continued)

*Primary Examiner* — David E Sosnowski
*Assistant Examiner* — Wesley Le Fisher
(74) *Attorney, Agent, or Firm* — Wood Herron & Evans LLP

(57) ABSTRACT

A web locating device for locating a shear web at a predefined location on an inner surface of a wind turbine blade shell is described. The base comprises a base and a first guide structure. The base is for securing to the inner surface of the blade shell at a predefined position on the inner surface and the first guide structure projects from the base. The first guide structure has a first guide surface arranged to guide a mounting portion of the shear web towards the predefined location on the inner surface of the wind turbine blade shell. The base of the device includes one or more alignment features for aligning with one or more reference features at the predefined position on the inner surface of the (Continued)

blade shell. Also described are a wind turbine blade, and a method of making a wind turbine blade.

14 Claims, 6 Drawing Sheets

(52) U.S. Cl.
CPC ... *F05B 2230/604* (2013.01); *F05B 2240/221* (2013.01); *Y02E 10/72* (2013.01); *Y02P 70/50* (2015.11)

(58) Field of Classification Search
USPC .......................................................... 269/264
See application file for complete search history.

(56) References Cited

U.S. PATENT DOCUMENTS

| | | | | |
|---|---|---|---|---|
| 3,663,931 | A * | 5/1972 | Brown | H01R 12/58 439/75 |
| 4,671,470 | A * | 6/1987 | Jonas | B29C 66/4326 244/119 |
| 7,244,487 | B2 * | 7/2007 | Brantley | B29C 65/561 244/123.7 |
| 7,670,527 | B2 * | 3/2010 | Malis | B29O 65/542 264/261 |
| 8,317,483 | B2 | 11/2012 | Gerber et al. | |
| 8,393,871 | B2 | 3/2013 | Yarbrough | |
| 8,985,515 | B2 * | 3/2015 | McCullough | B29D 99/001 244/131 |
| 2010/0003141 | A1 | 1/2010 | Hancock | |
| 2010/0135815 | A1 * | 6/2010 | Bagepalli | F03D 1/0675 416/226 |
| 2010/0162567 | A1 * | 7/2010 | Kirkwood | B64C 3/28 29/897.2 |
| 2010/0310379 | A1 * | 12/2010 | Livingston | F03D 1/0675 416/229 R |
| 2011/0008175 | A1 | 1/2011 | Gau | |
| 2012/0027612 | A1 * | 2/2012 | Yarbrough | F03D 1/065 416/226 |
| 2012/0027613 | A1 | 2/2012 | Yarbrough | |
| 2013/0189103 | A1 * | 7/2013 | Tobin | F03D 1/065 416/87 |
| 2014/0294591 | A1 * | 10/2014 | Liu | F16B 2/10 416/226 |
| 2014/0369849 | A1 * | 12/2014 | Flach | F03D 1/0675 416/230 |
| 2015/0152838 | A1 * | 6/2015 | Merzhaeuser | F03D 1/0675 416/226 |
| 2015/0316023 | A1 | 11/2015 | Sandercock et al. | |
| 2015/0316026 | A1 * | 11/2015 | Noronha | F03D 1/0675 416/226 |

FOREIGN PATENT DOCUMENTS

| | | | | |
|---|---|---|---|---|
| CN | 101749173 | A | 6/2010 | |
| CN | 101825057 | A | 9/2010 | |
| CN | 101830074 | A | 9/2010 | |
| CN | 102198856 | A | 9/2011 | |
| CN | 102554817 | A | 7/2012 | |
| CN | 102650269 | A | 8/2012 | |
| CN | 102817771 | A | 12/2012 | |
| EP | 2878807 | A1 | 6/2015 | |
| GB | 2527587 | A | 12/2015 | |
| WO | 2013086667 | A1 | 6/2013 | |
| WO | 2014094780 | A1 | 6/2014 | |
| WO | WO-2014094780 | A1 * | 6/2014 | ......... B29D 99/0028 |
| WO | 2015003717 | A1 | 1/2015 | |

OTHER PUBLICATIONS

China National Intellectual Property Administration, First Notification of Office Action in CN Application No. 201680079830.5, dated Jul. 3, 2019.

Danish Patent and Trademark Office, Search and Examination Report in PA 2015 70764, dated Jun. 23, 2016.

European Patent Office, International Search Report and Written Opinion in PCT Application Serial No. PCT/DK2016/050393, dated Feb. 23, 2017.

China National Intellectual Property Administration, 2nd Notification of Office Action in Cn Application No. 201680079830.5, dated Mar. 31, 2020.

\* cited by examiner

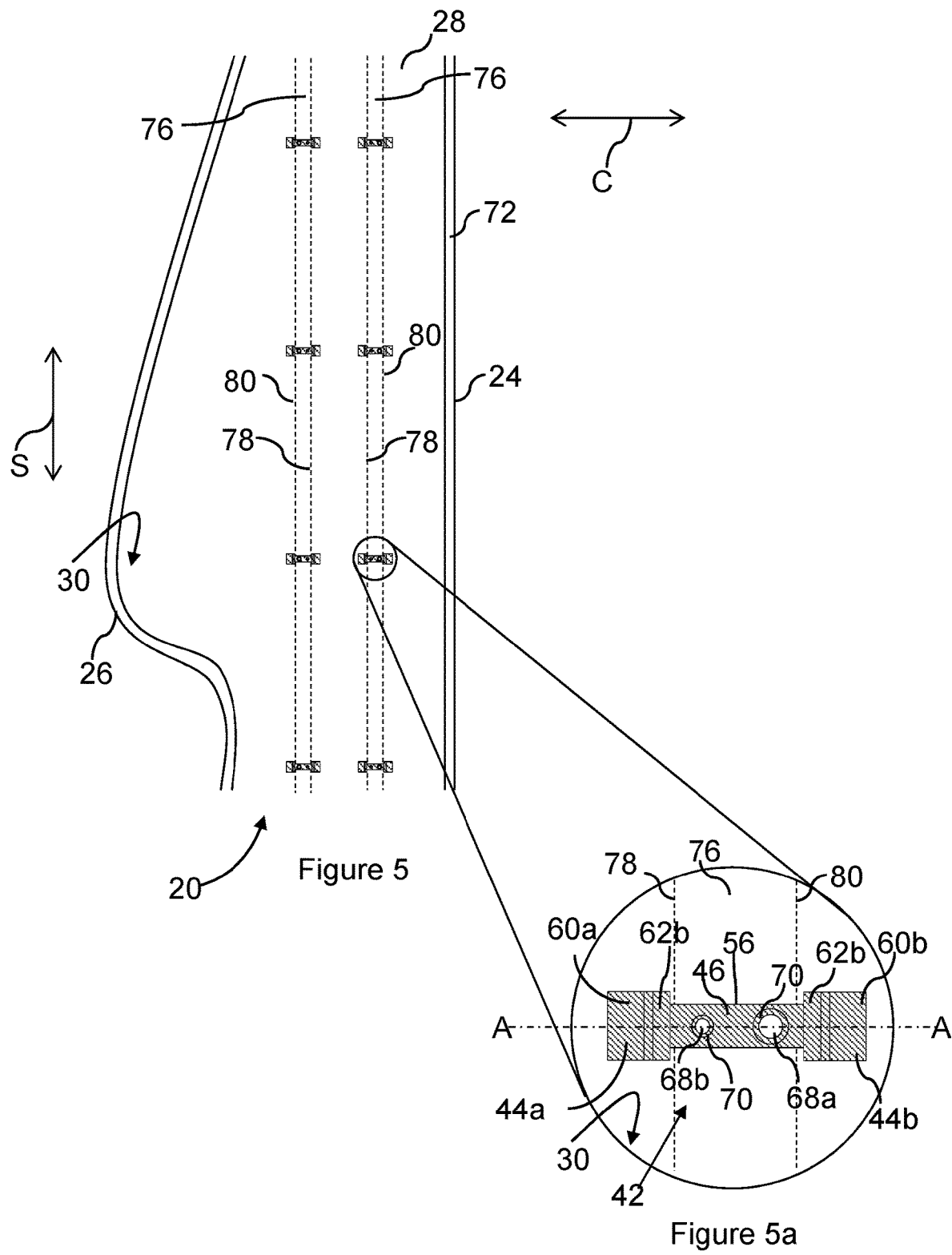

MANUFACTURE OF WIND TURBINE BLADES

TECHNICAL FIELD

The present invention relates generally to the manufacture of wind turbine blades, and more specifically to a device and method for ensuring accurate positioning of shear webs during blade manufacture.

BACKGROUND TO THE INVENTION

Modern wind turbine blades typically comprise a hollow shell made up of two half-shells bonded together along leading and trailing edges of the blade. One or more longitudinally-extending shear webs are provided within the internal cavity of the blade. The shear webs are bonded between opposed inner surfaces of the respective half-shells.

It is important that the shear webs are bonded to the inner surfaces of the half-shells at precisely defined positions to ensure that the manufactured blade conforms to its design specification. To help position the shear webs correctly relative to the half-shells, it is known to laser-project predefined templates across the inner surfaces of the half-shells. These templates indicate the locations at which the shear webs are to be bonded.

It is also known to attach guide blocks to the inner surfaces of the half-shells. The guide blocks assist in locating the shear webs in the intended positions on the inner surfaces of the half shells. . The projected templates also include reference features indicating the positions at which the guide blocks are to be attached. However, it has been found to be challenging to align the guide blocks accurately with the projected reference features because the guide blocks have a tendency to obscure the projected light during the attachment process.

Inaccurate positioning of the guide blocks can affect the overall positioning of the shear webs. In particular, if the guide blocks are not precisely aligned with the projected reference features then there is a risk that the guide blocks may not positively locate the shear web or that the guide blocks may clash with the shear web and prevent the shear web from being bonded precisely in the intended location.

It is against this background that the present invention has been devised.

SUMMARY OF THE INVENTION

According to an aspect of the invention, there is provided a web locating device for locating a shear web at a predefined location on an inner surface of a wind turbine blade shell, the device comprising a base for securing to the inner surface of the blade shell at a predefined position on the inner surface; and a first guide structure projecting from the base, the first guide structure having a first guide surface arranged to guide a mounting portion of the shear web towards the predefined location on the inner surface of the wind turbine blade shell, the base of the device includes one or more alignment features for aligning with one or more reference features at the predefined position on the inner surface of the blade shell.

The one or more alignment features may comprise an aperture provided in the base. The base may taper in thickness at a periphery of the aperture.

The one or more alignment features may comprise a plurality of apertures provided in the base. The plurality of apertures may comprise two apertures having a different shape and/or size to one another.

The first guide surface may be inclined relative to the base.

The web locating device may further comprise a second guide structure projecting from the base. The first and second guide structures may be mutually spaced apart by an intermediate portion of the base.

The second guide structure may comprise a second guide surface arranged to guide the portion of the shear web towards the predefined location on the inner surface of the wind turbine blade shell.

The one or more alignment features may be provided in the intermediate portion of the base.

The base may be substantially planar and/or flexible.

The device may be formed as a single moulding.

The first guide structure may project from a first side of the base. The device may further comprise adhesive tape on a second side of the base.

According to another aspect of the invention, there is provided a wind turbine blade comprising a blade shell having an inner surface with one or more web locating devices according to the previously-described aspect bonded to the inner surface.

According to another aspect of the invention, there is provided a method of making a wind turbine blade, the method comprising: providing a blade shell having an inner surface; providing a web having a mounting portion for bonding to the inner surface of the blade shell; providing a web locating device having a base and one or more guide structures projecting from the base, the or each guide structure having a guide surface, and the base including one or more alignment features; providing one or more reference features at a predefined position on the inner surface of the blade shell; aligning one or more alignment features of the base of the web locating device with the one or more reference features; securing the base of the web locating device to the inner surface of the blade shell at the predefined position; and guiding the mounting portion of the shear web over the guide surface(s) of the one or more guide structures towards a predefined mounting location defined on the inner surface of the blade shell.

The one or more alignment features may comprise one or more apertures. The method may comprise aligning the or each aperture with a correspondingly-shaped reference feature on the inner surface of the blade shell.

The one or more alignment features may comprise at least two apertures having a different shape and/or size to one another. The method may comprise providing at least two reference features at the predefined position on the inner surface of the blade shell. The reference features may each correspond in shape and size to a respective aperture.

The method may comprise applying adhesive to the predefined location on the inner surface of the blade shell. The adhesive may be applied such that some of the adhesive at least partially covers the base of the web locating device. Some of the adhesive may preferably and advantageously pass through the or each aperture in the base to occupy a space defined between the base and the inner surface of the blade shell at the predefined position on the inner surface at which the device is secured. The adhesive may be applied directly to the inner surface of the blade shell, or on the mounting portion of the web.

BRIEF DESCRIPTION OF THE DRAWINGS

In order that the invention may be more readily understood, non-limiting examples of the invention will now be described in more detail with reference to the accompanying figures, in which:

FIG. 5 shows a plurality of web locating devices attached to the inner surface of the half-shell at the respective mounting positions;

FIG. 5a is an enlarged portion of FIG. 5 showing a web locating device aligned with the reference features shown in FIG. 4a;

FIG. 6a is a cross-sectional view of the web locating device shown in FIG. 5a, taken along the line A-A in FIG. 5a;

DETAILED DESCRIPTION OF EMBODIMENTS OF THE INVENTION

Figure 1:
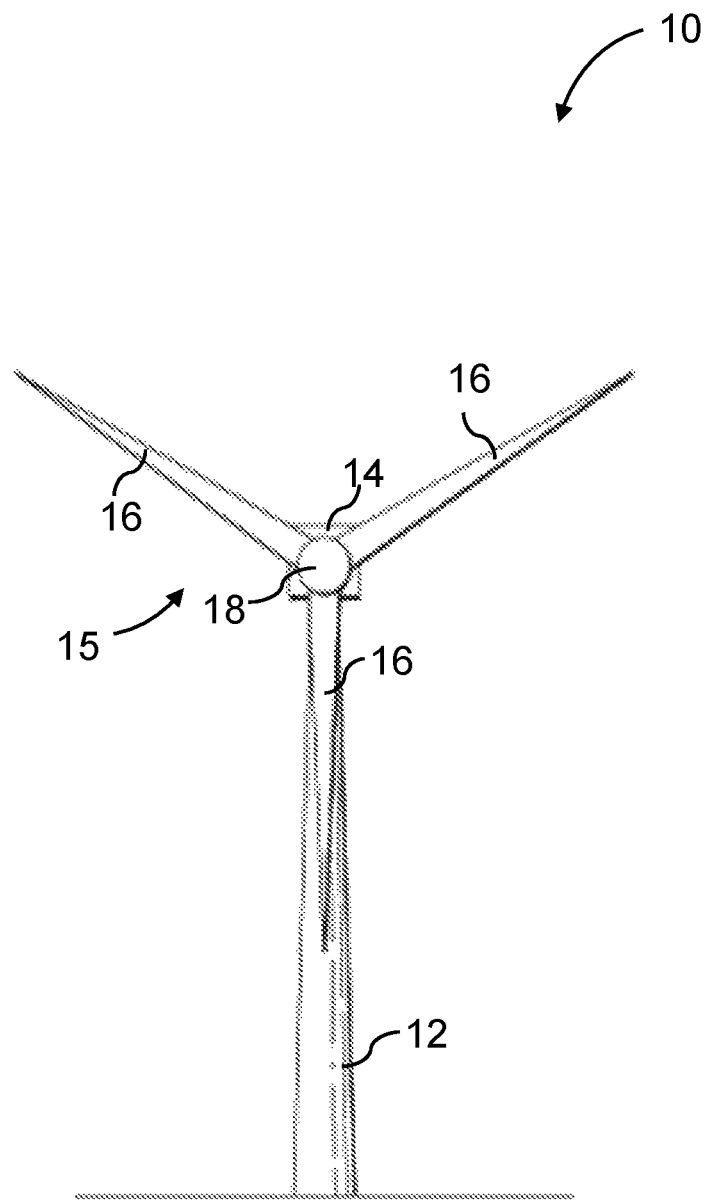
FIG. 1 is a front view of a wind turbine comprising a plurality of rotor blades.

FIG. 1 shows a wind turbine 10 according to an embodiment of the present invention. The wind turbine 10 comprises a tower 12 supporting a nacelle 14 to which a rotor 15 is mounted. The rotor 15 comprises a plurality of wind turbine blades 16 that extend radially from a central hub 18. In this example, the rotor 15 comprises three blades 16.

Figure 2:
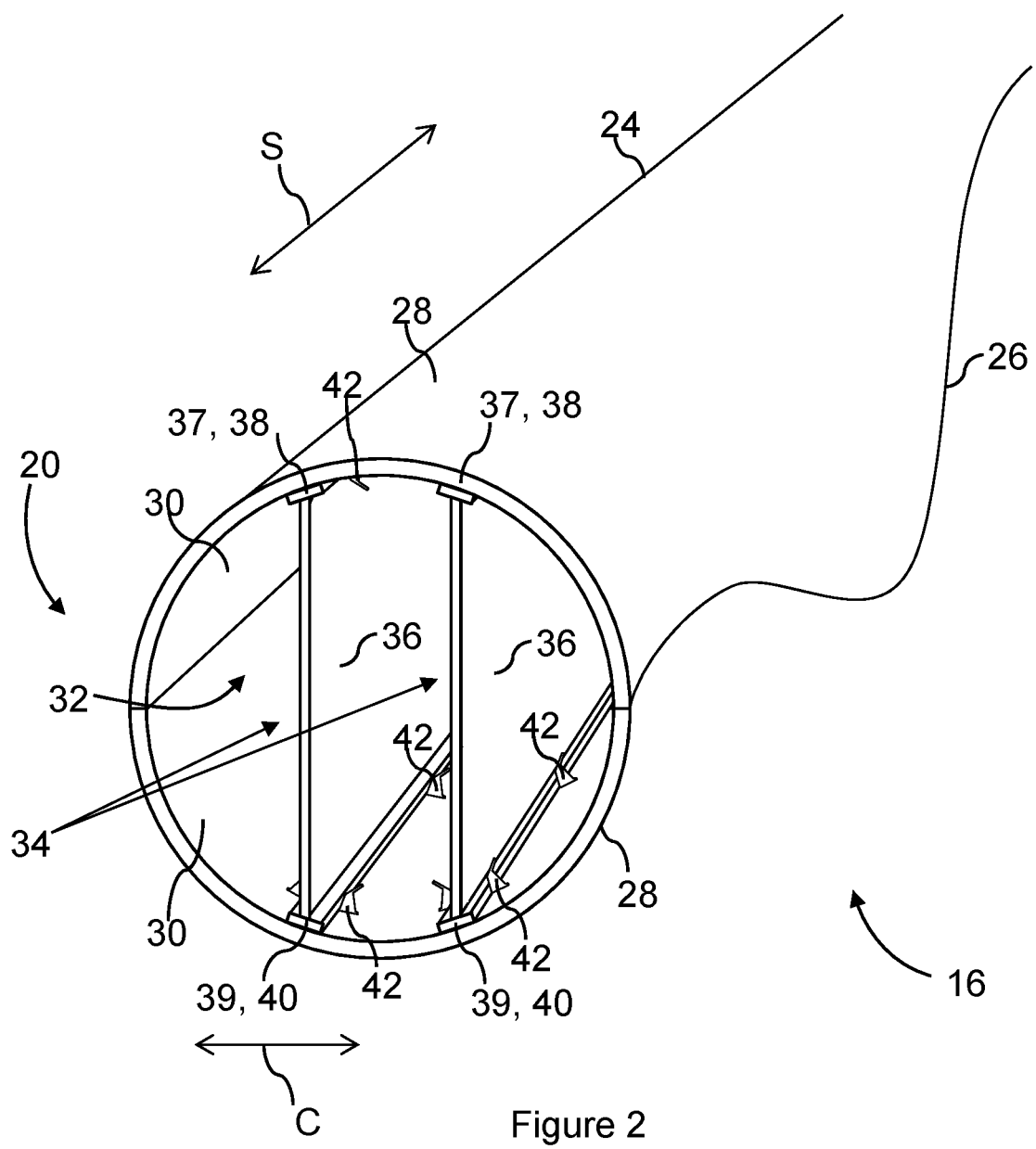
FIG. 2 is a perspective view of part of a rotor blade in which two shear webs and a plurality of web locating devices can be seen mounted inside the blade.

Referring now to FIG. 2, this shows one of the rotor blades 16 of the wind turbine 10 as viewed from a root end 20 of the blade 16. The blade 16 extends in a spanwise direction S from a root end 20 towards a tip end (not shown), and in a chordwise direction C between a leading edge 24 and a trailing edge 26. The blade 16 comprises a hollow shell made up of two half-shells 28 bonded together along the leading and trailing edges 24, 26 of the blade 16. Each half-shell 28 has a concave-curved inner surface 30 extending in the chordwise direction C. Together, the inner surfaces 30 of the half-shells 28 define an internal cavity 32 of the blade 16.

A pair of shear webs 34 are located within the internal cavity 32, and extend inside the blade 16 in the spanwise direction S. Each shear web 34 comprises a web element 36 having an upper edge 37 defining an upper mounting flange 38 and a lower edge 39 defining a lower mounting flange 40. The upper and lower mounting flanges 38, 40 of each shear web 34 are bonded respectively to the inner surfaces 30 of the upper and lower half-shells 28. The shear webs 34 are load bearing components that serve to strengthen the blade 16. In use, the shear webs 34 transfer loads from the blade 16 to the wind turbine hub 18 (see FIG. 1).

A plurality of web locating devices 42 are bonded to the inner surfaces 30 of the half-shells 28. The devices 42 are spaced at spanwise intervals along the length of the blade 16. As will be described, the web locating devices 42 ensure the correct positioning of the shear webs 34 during manufacture of the blade 16. Features of the web locating devices 42 will now be described with reference to FIGS. 3 to 6.

Figure 3:
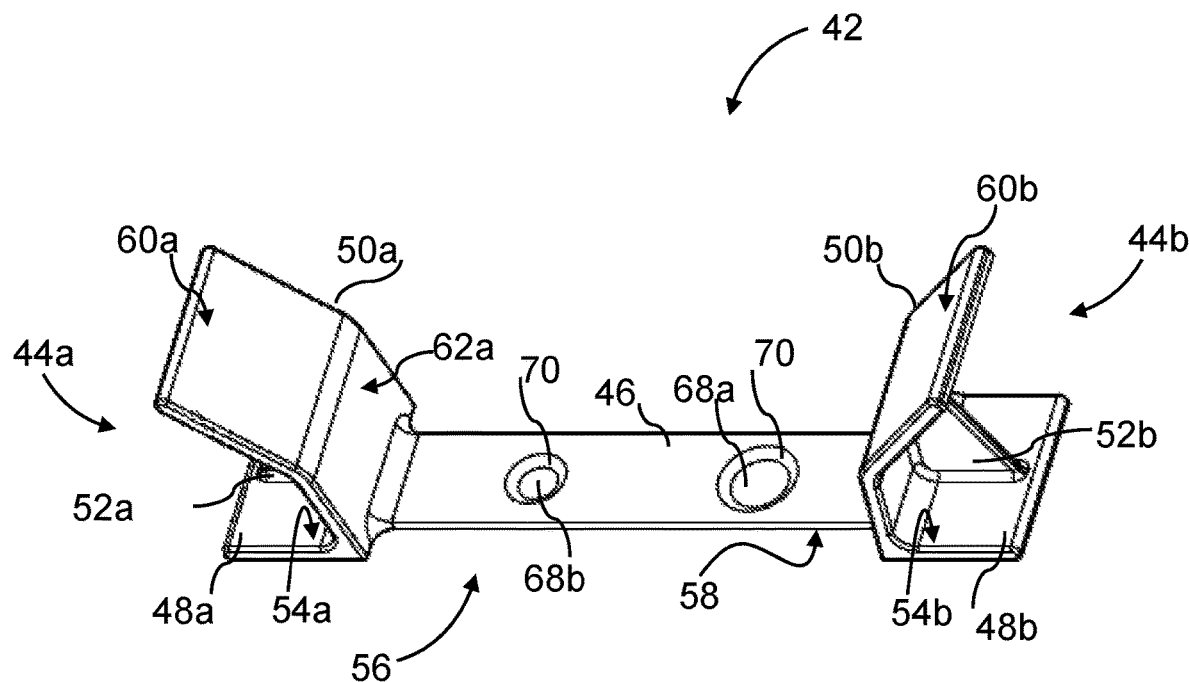
FIG. 3 is a perspective view of one of the web locating devices shown in FIG. 2.

Referring to FIG. 3, this shows a web locating device 42 in isolation. The device 42 is an injection moulded plastics component of unitary structure, and comprises first and second guide structures 44a, 44b mutually separated by an intermediate connecting portion 46. The intermediate connecting portion 46 is substantially planar and rectangular and the guide structures 44a, 44b are located at opposite ends of the connecting portion 46.

Each guide structure 44a, 44b comprises a mounting portion 48a, 48b, a guide portion 50a, 50b and a web portion 52a, 52b. The guide portion 50a, 50b of each guide structure 44a, 44b projects from an upper surface 54a, 54b of the mounting portion 48a, 48b. The web portion 52a, 52b extends between the guide portion 50a, 50b and the upper surface 54a, 54b of the mounting portion 48a, 48b to reinforce and support the guide portion 50a, 50b.

Figure 3A:
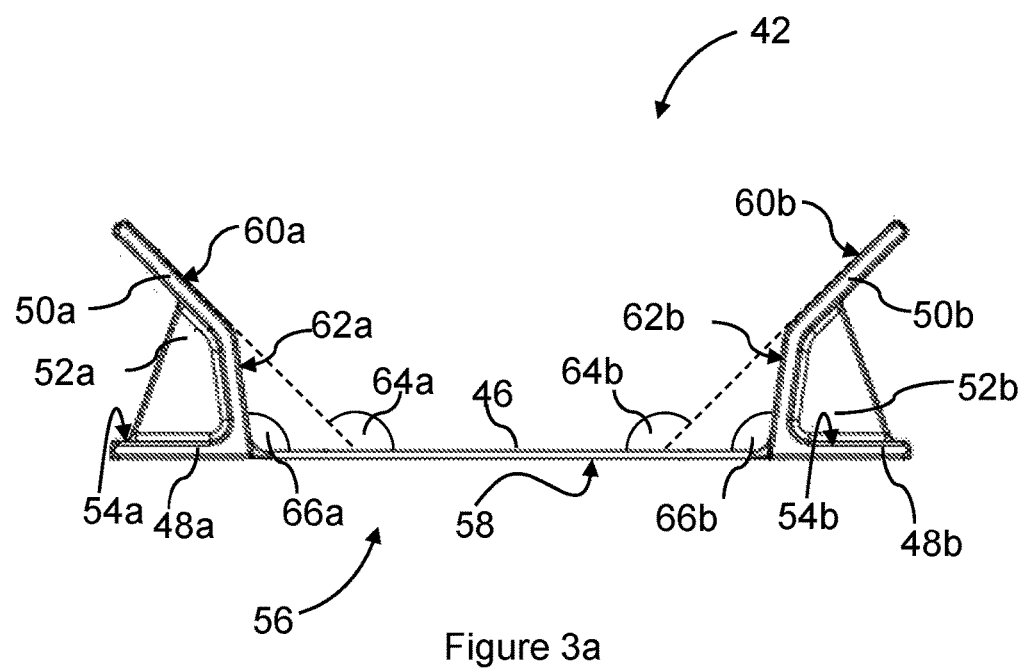
FIG. 3a is a front view of the web locating device shown in FIG. 3.

The mounting portions 48a, 48b of the guide structures 44a, 44b are rectangular and substantially planar. Together, the mounting portions 48a, 48b of the guide structures 44a, 44b and the intermediate connecting portion 46 form a base 56 of the device 42. As is most clearly seen in FIG. 3a, the base 56 of the device 42 defines a flat lower mounting surface 58. The base 56 of the device 42 is configured to be slightly flexible. In this example, the thickness of the base 56 is approximately 2 mm.

The guide portion 50a, 50b of each guide structure 44a, 44b defines a primary guide surface 60a, 60b and a secondary guide surface 62a, 62b. The secondary guide surface 62a, 62b is located between the base 56 of the device 42 and the primary guide surface 60a, 60b. The primary and secondary guide surfaces 60a, 60b, 62a, 62b are substantially rectangular and are inclined relative to the base 56 of the device 42. In this example, the primary guide surface 60a, 60b forms an obtuse angle 64a, 64b with the base 56 of approximately 135 degrees. The secondary guide surface 62a, 62b forms a less obtuse angle 66a, 66b with the base 56 than the angle 64a, 64b between the primary guide surface 60a, 60b and the base 56. In this example, the angle 66a, 66b between the secondary guide surface 62a, 62b and the base 56 is approximately 98 degrees.

Referring to FIG. 3, the base 56 of the device 42 includes alignment features in the form of two circular apertures 68a, 68b provided in the intermediate portion 46 of the base 56. The apertures 68a, 68b are dissimilar in that one of the apertures 68a has a larger diameter than the other 68b. Each aperture 68a, 68b has a chamfered periphery 70, whereby an annular region of the base 56 surrounding the aperture 68a, 68b tapers in thickness towards the aperture 68a, 68b. The apertures 68a, 68b may be formed during the moulding process or provided after the moulding process, for example by removing material from the base 56. As will be described in more detail later, the apertures 68a, 68b allow the web locating device 42 to be accurately aligned with reference features that are projected on the inner surface 30 of a blade half-shell 28.

Figures 4, 4A:
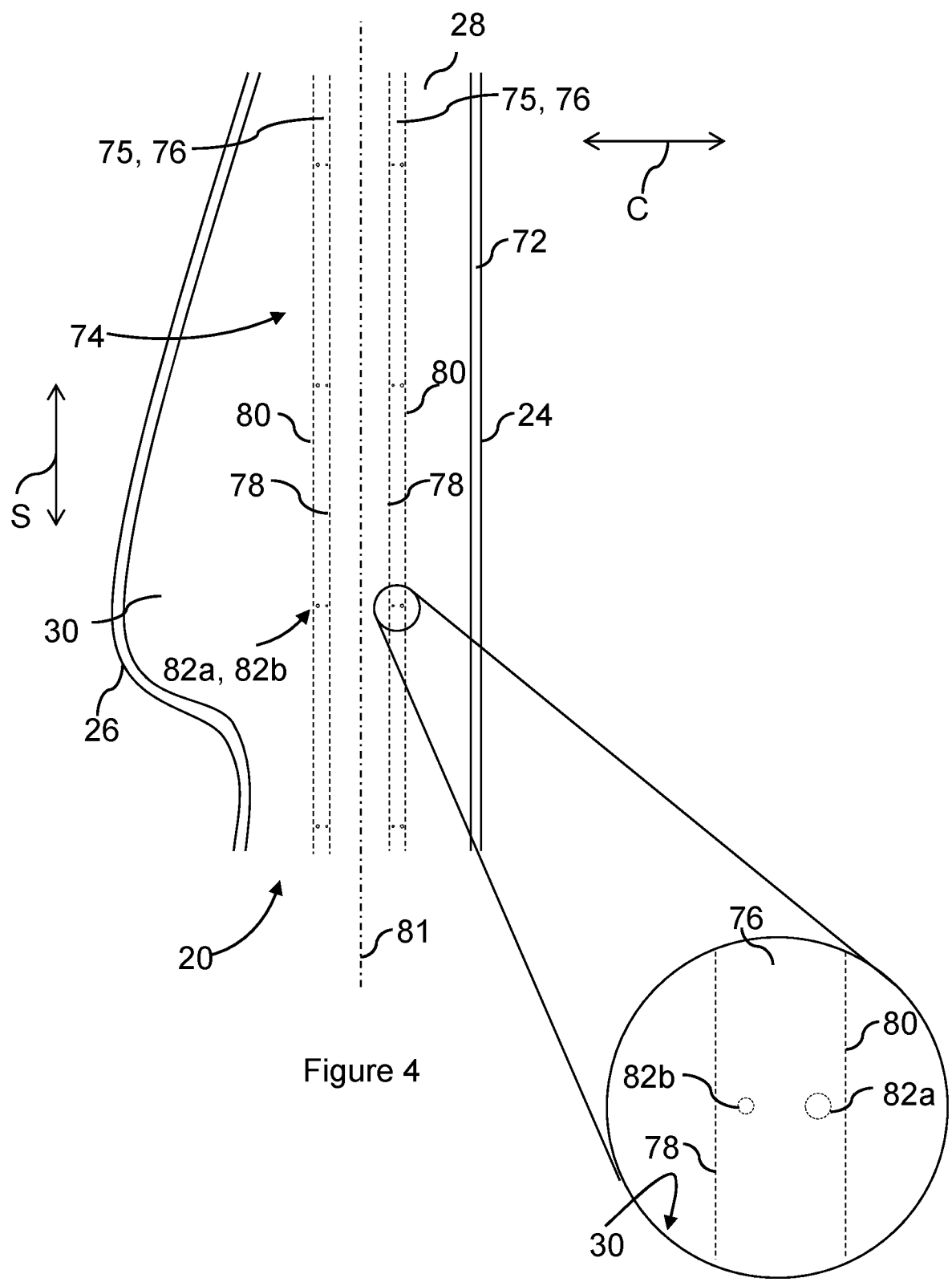
FIG. 4 shows a template projected onto the inner surface of a blade half-shell.
FIG. 4a is an enlarged portion of FIG. 4, showing reference features defining a mounting position for a web locating device.

Referring now to FIG. 4, this shows a plan view of part of a blade half-shell 28 within a half-mould 72. A laser-projected template 74 is superimposed over the inner surface 30 of the half-shell 28. The template 74 indicates two strips 75, extending in a spanwise direction S along the length of the half-shell 28. These strips define mounting regions 76 for the flanges 38, 40 of the two shear webs 34. Each mounting region 76 has an inner edge 78 and an outer edge 80 defined relative to a longitudinal centreline 81 of the half-shell 28. The template 74 also includes a plurality of reference features 82a, 82b spaced at spanwise intervals along the shear web mounting regions 76. The reference features 82a, 82b indicate a series of mounting positions for a plurality of web locating devices, such as the device 42 shown in FIG. 3.

As shown in FIG. 4a, which shows an enlarged view of a mounting position, the projected reference features 82a, 82b correspond in size and shape to the alignment features 68a, 68b of the web locating device 42. Therefore, in this example, the projected template 74 includes, at each mounting position, two circles 82a, 82b corresponding in size to the circular apertures 68a, 68b of the web locating device 42. Accordingly, one of the projected circles 82a has a larger diameter than the other projected circle 82b.

To position a web locating device 42 at a mounting position on the inner-surface of the half-shell 28, the circular apertures 68a, 68b of the web locating device 42 are aligned with the respective projected circular reference features 82a, 82b. FIG. 5 shows the blade half-shell 28 with a plurality of web locating devices 42 attached to the inner surface 30 of the half-shell 28, aligned at their respective mounting positions.

Whilst the various web locating devices 42 shown in FIG. 5 are all substantially identical, in other examples and/or in other regions of the blade, web locating devices 42 having a different size or shape may be used. When a plurality of dissimilar web locating devices 42 are used, each different device 42 may have a different configuration of alignment features 68a, 68b. The projected template 74 may therefore have various different reference features 82a, 82b corresponding to the different alignment features 68a, 68b of the different web locating devices 42. The correspondence between the alignment features 68a, 68b of the device 42 and the projected reference features 82a, 82b therefore advantageously indicates the correct location for mounting a particular device 42 and thus avoids the possibility of a device 42 being mounted in an incorrect location since it will not be possible to align a device 42 with the reference features 82a, 82b at an incorrect location.

Since the alignment features 68a, 68b and corresponding reference features 82a, 82b in the present example are dissimilar, the projected template 74 therefore not only indicates the correct position of the web locating devices 42 but also the correct orientation of the devices 42. Whilst the first and second guide structures 44a, 44b of the web locating device 42 illustrated in FIG. 3 are substantially identical, in other embodiments these may be dissimilar depending for example on the particular profile of the shear webs to be located, and so ensuring the correct orientation of the device 42 may be critical.

Referring to FIG. 5a, which shows an enlarged view of a web locating device 42 attached at a mounting position, the circular apertures 68a, 68b of the web locating device 42 are configured to allow the device 42 to be accurately aligned with the projected reference features 82a, 82b. The thin profile of the base 56 of the device 42 means that the base 56 does not significantly obstruct the projection of the reference features 82a, 82b onto the inner surface 30 of the half-shell 28. The chamfered peripheries 70 of the apertures 68a, 68b means that the base 56 has effectively zero thickness at the peripheries 70 of the apertures 68a, 68b. This allows the apertures 68a, 68b to be aligned precisely with the projected reference features 82a, 82b without the base 56 or other parts of the device 42 obscuring the projected light.

The web locating device 42 spans the shear web mounting region 76 in the chordwise direction C. Specifically, the device 42 is positioned such that the guide structures 44a, 44b are located either side of the shear web mounting region 76, respectively adjacent to the inner and outer edges 78, 80 of the mounting region 76. The flexibility of the base 56 of the device 42 advantageously allows the device 42 to conform to the local curvature of the inner surface 30 of the half-shell 28.

The intermediate connecting portion 46 of the device 42, between the guide structures 44a, 44b, coincides with and spans the shear web mounting region 76 and defines a seat for the flange of a shear web 34. Since the mutual separation of the guide structures 44a, 44b is fixed by the integrated connecting portion 46, the defined seat is sized to fit the mounting flange 38. In this regard, the device 42 presents a particular advantage over the use of separate unconnected guide blocks arranged adjacent the respective edges 78, 80 of the mounting region 76, where both blocks must be mounted in precisely the right place to ensure a particular separation between the blocks; such arrangements are therefore subject to errors in the alignment of both blocks A process for bonding a shear web 34 to the inner surface 30 of the half-shell 28 will now be described with reference to FIGS. 6a, 6b and 6c.

Figure 6A:
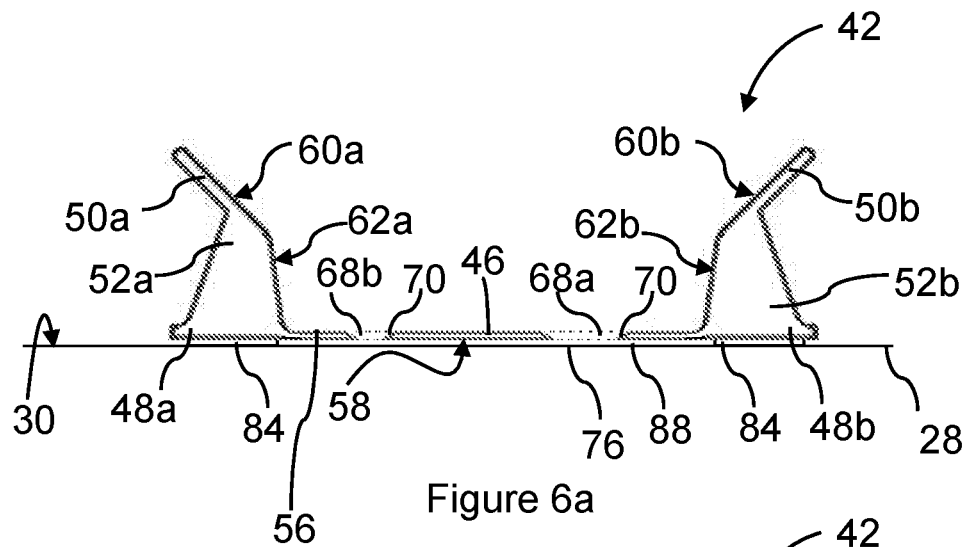

Referring to FIG. 6a, which is a cross-sectional view of the web locating device 42 of FIG. 5a taken along the line A-A in FIG. 5a, once the web locating device 42 has been aligned with the reference features 82a, 82b (shown in FIG. 4a) at the mounting position, it is secured to the inner surface 30 of the half-shell 28 by means of pressure sensitive adhesive tape 84 provided on the mounting surface 58 of the base 56. The tape 84 is provided on the lower surfaces of the mounting portions 48a, 48b of the guide structures 44a, 44b. Thus, the pressure sensitive tape 84 is affixed to the inner surface 30 of the half-shell 28 at either side of the shear web 34 mounting region 76. The thickness of the tape 84 results in the base 56 of the device 42 being spaced slightly apart from the inner surface 30 of the half shell 28 in the shear web mounting region 76.

Figure 6B:
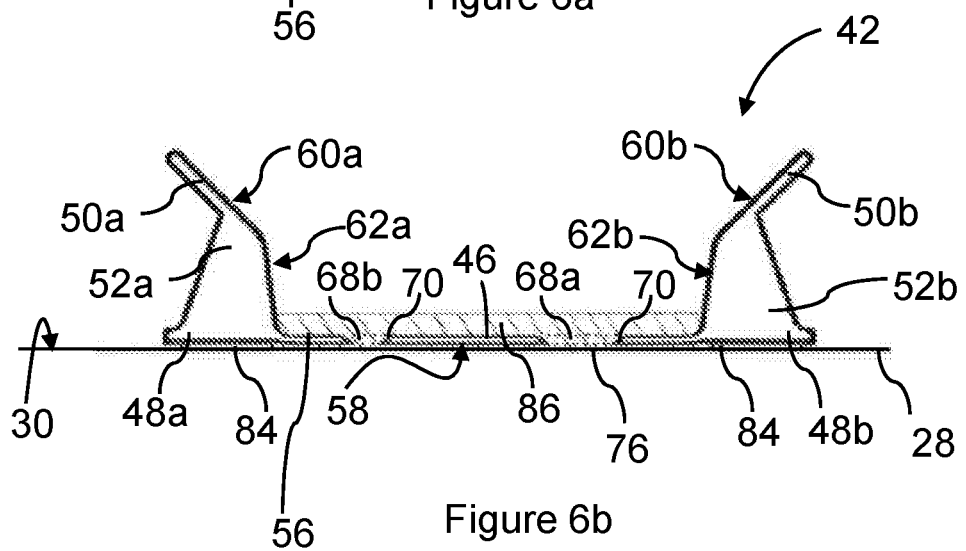
FIG. 6b corresponds to FIG. 6a and shows adhesive applied on top of the web locating device.

Referring now to FIG. 6b, after the web locating device 42 has been secured to the inner surface 30 of the half-shell 28, adhesive 86 is applied along the shear web mounting regions 76 indicated by the projected template 74 shown in FIG. 5 to define bond lines between the shear webs and the inner surface 30 of the half shell 28. The adhesive 86 is applied over the intermediate connecting portion 46 of the web locating device 42. Thus, the adhesive 86 defines a bond line extending along each shear web mounting region 76, over the intermediate connecting portions 46 of the web locating devices 42.

The adhesive 86 passes through the apertures 68a, 68b in the intermediate connecting portion 46 of the device 42 and fills the space 88 between the base 56 of the device 42 and the inner surface 30 of the half-shell 28. The adhesive 86 also fills the apertures 68a, 68b themselves. Thus, the provision of alignment features in the form of apertures 68a, 68b in the base 56 of the web locating device 42 additionally and advantageously serves to minimise voids within the bond lines.

Figure 6C:
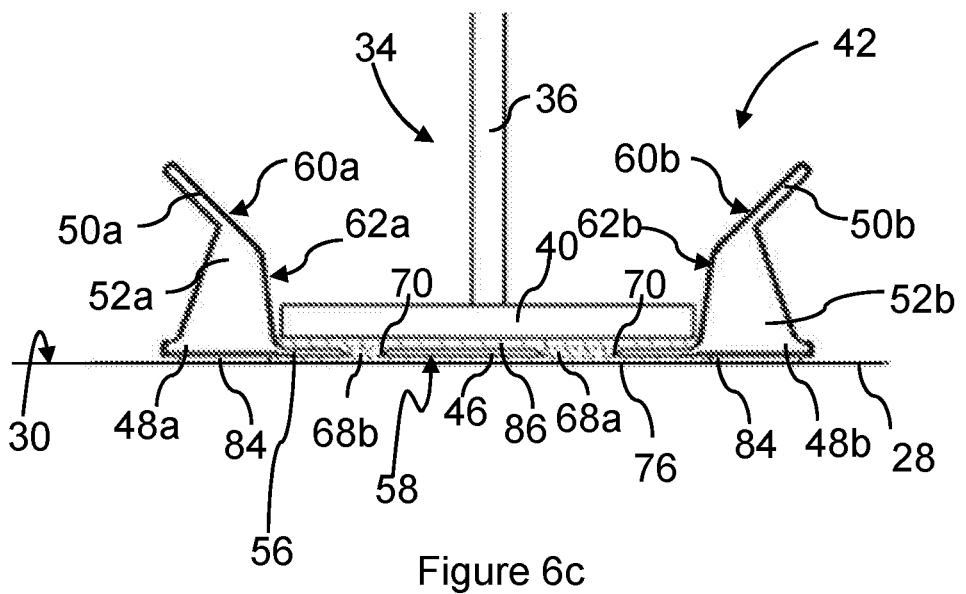
FIG. 6c also corresponds to FIG. 6a and shows a shear web bonded to the inner surface of the blade and located by the web locating device.

As shown in FIG. 6c, a shear web 34 is then manoeuvred into position such that the mounting flange 40 occupies the seat defined by the web locating device 42. The web locating device 42 is configured to ensure that the shear web 34 is correctly positioned at the shear web mounting region 76. As the shear web 34 is manoeuvred into position, it is initially guided by the primary guide surfaces 60a, 60b of the web locating device 42 towards the mounting region 76 defined on the inner surface 30 of the half-shell 28. Immediately prior to the shear web 34 being positioned in the seat, the flange 40 of the shear webs 34 is guided by the secondary guide surfaces 62a, 62b of the web locating device 42 in a direction substantially perpendicular to the local surface of the half-shell 28, i.e. the shear web 34 is guided directly onto the shear web mounting region 76. Consequently, the final motion of the shear web 34 towards the mounting region 76 is in a substantially vertical direction and hence substantially no shear force is applied to the shear web 34 at the point that the shear web 34 is positioned at the mounting region 76.

The absence of shear forces being applied during squeezing of the adhesive 86 ensures that a strong bond is created between the shear webs 34 and the inner surface 30 of the half-shell 28. The vertical motion of the shear web 34 also prevents shear forces being applied to the web locating device 42 which advantageously prevents the device being dislodged. When in position, the edges of the mounting flange 40 abut the secondary guide surfaces 62a, 62b of the web locating device 42 and the shear web mounting flange 40 is correctly positioned at the shear web mounting region 76.

The preceding description generally refers to a single blade half-shell 28; however, the skilled person will appreciate that the web locating devices 42 of the invention are equally suited to being attached to the inner surface 30 of either half-shell 28 and so the above description equally applies to the other half-shell 28.

Many modifications may be made to the specific examples describes above without departing from the scope of the present invention. For example, the specific shape of the web locating devices 42 in other embodiments of the invention may be different. In particular, devices with a single guide structure 44a or 44b or dissimilar guide structures 44a, 44b are envisaged within the scope of the present invention. The alignment features 68a, 68b need not be circular but may be any other suitable shape or size, and may for example comprise cut-outs in the periphery of the base 56. Whilst a laser-projected template 74 is described above, this is not essential to the invention. In other embodiments, a template may be projected by other means, or a template may be permanently or semi-permanently applied to the inner surfaces of the half shells, for example by marking or printing. In another example, the adhesive 86 that bonds the shear web 34 to the shell 28 is not applied directly to the shell, but instead is applied to the shear web mounting flange before the shear web is manoeuvred into position onto the shell.

The invention claimed is:

1. A wind turbine blade comprising a blade shell having an inner surface, wherein at least one web locating device for locating a shear web at a predefined location on the inner surface is bonded to the inner surface, the device comprising:
    a base secured to the inner surface of the blade shell at a predefined position on the inner surface; and
    a first guide structure projecting from the base, the first guide structure having a first guide surface arranged to guide a mounting portion of the shear web towards the predefined location on the inner surface of the wind turbine blade shell,
    wherein the base of the device includes one or more alignment features comprising one or more apertures aligned with one or more reference features at the predefined position on the inner surface of the blade shell, and
    wherein adhesive at least partially covers the base of the at least one web locating device and passes through the one or more apertures in the base to occupy a space defined between the base and the inner surface of the blade shell at the predefined position on the inner surface at which the device is secured.

2. The wind turbine blade of claim 1, wherein the one or more alignment features comprise a plurality of apertures provided in the base.

3. The wind turbine blade of claim 2, wherein the plurality of apertures comprise two apertures having a different shape and/or size to one another.

4. The wind turbine blade of claim 1, wherein the first guide surface is inclined relative to the base.

5. The wind turbine blade of claim 1, further comprising a second guide structure projecting from the base, wherein the first and second guide structures are mutually spaced apart by an intermediate portion of the base.

6. The wind turbine blade of claim 5, wherein the second guide structure comprises a second guide surface arranged to guide the portion of the shear web towards the predefined location on the inner surface of the wind turbine blade shell.

7. The wind turbine blade of claim 5, wherein the one or more alignment features are provided in the intermediate portion of the base.

8. The wind turbine blade of claim 1, wherein the base is substantially planar and/or flexible.

9. The wind turbine blade of claim 1, wherein the device is formed as a single moulding.

10. The wind turbine blade of claim 1, wherein the first guide structure projects from a first side of the base and the device further comprises adhesive tape on a second side of the base.

11. The wind turbine blade of claim 1, wherein the base tapers in thickness at a periphery of the one or more apertures.

12. A method of making a wind turbine blade, the method comprising:
    providing a blade shell having an inner surface;
    providing a web having a mounting portion for bonding to the inner surface of the blade shell;
    providing a web locating device having a base and one or more guide structures projecting from the base, the or each guide structure having a guide surface, and the base including one or more alignment features, wherein the one or more alignment features comprise one or more apertures;
    providing one or more reference features at a predefined position on the inner surface of the blade shell;
    aligning the one or more alignment features of the base of the web locating device with the one or more reference features;
    securing the base of the web locating device to the inner surface of the blade shell at the predefined position by applying adhesive to the predefined location on the inner surface of the blade shell such that some of the adhesive at least partially covers the base of the web locating device and passes through the or each aperture in the base to occupy a space defined between the base and the inner surface of the blade shell at the predefined position on the inner surface at which the device is secured; and
    guiding the mounting portion of the shear web over the guide surface(s) of the one or more guide structures towards a predefined mounting location defined on the inner surface of the blade shell.

13. The method of claim 12, wherein the method further comprises aligning the one or more each apertures with correspondingly-shaped one or more reference features on the inner surface of the blade shell.

14. The method of claim 13, wherein the one or more alignment features comprise at least two apertures having a different shape and/or size to one another, and the method comprises providing at least two reference features at the predefined position on the inner surface of the blade shell, the reference features each corresponding in shape and size to a respective aperture.

\* \* \* \* \*

UNITED STATES PATENT AND TRADEMARK OFFICE
CERTIFICATE OF CORRECTION

| | |
|---|---|
| PATENT NO. | : 10,920,744 B2 |
| APPLICATION NO. | : 15/777398 |
| DATED | : February 16, 2021 |
| INVENTOR(S) | : Jonathan Smith et al. |

It is certified that error appears in the above-identified patent and that said Letters Patent is hereby corrected as shown below:

In the Claims

Column 8, Claim 13, Line 65, delete "each".

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*